United States Patent [19]

Levengood

[11] 3,852,914

[45] Dec. 10, 1974

[54] METHOD FOR DETERMINING THE VIABILITY OF SEEDS PRIOR TO GERMINATION

[75] Inventor: William C. Levengood, Grass Lake, Mich.

[73] Assignee: Sensors, Incorporated, Grass Lake, Mich.

[22] Filed: Sept. 1, 1972

[21] Appl. No.: 285,930

[52] U.S. Cl.................... 47/58, 47/1.3, 324/71 R
[51] Int. Cl............................................ A01b 79/00
[58] Field of Search.................. 47/14–16, 57.6, 47/58, 1.3, DIG. 8, DIG. 9, 56; 324/71 R

[56] References Cited
UNITED STATES PATENTS

| 1,106,039 | 8/1914 | Fry.................................... 47/169 |
| 1,987,244 | 1/1935 | Moore................................. 47/58 |
| 2,040,161 | 5/1936 | Widmann........................... 47/1.3 X |
| 3,460,492 | 8/1969 | Dickinson et al..................... 47/56 |
| 3,530,372 | 9/1970 | Laukien............................. 47/14 X |

FOREIGN PATENTS OR APPLICATIONS

| 102,081 | 11/1916 | Great Britain........................ 47/1.3 |
| 422,162 | 1/1935 | Great Britain........................ 47/1.2 |
| 398,555 | 7/1924 | Germany.......................... 47/DIG. 9 |

OTHER PUBLICATIONS

Waller, A. D.: "An Attempt To Estimate the Vitality Of Seeds By An Electric Method." Proc. Roy. Soc., 1901, 68:79–92.
"Electricity and Plant Growth," Maurice Franz, Organic Gardening & Farming, Aug. 1965. pp. 59–72.
"Bioelectric Fields and Growth," E. J. Lund, Austin, Univ. of Texas Press, 1947, pp. 151–160.
"Electrical Properties of Seed Associated With Viability & Vigor" by R. N. Matthes & A. H. Boyd, ASAF Trans. Vol. 12, No. 6, 1969.
Burr; H. S. Electrical Correlates of Pure & Hybrid Strains Of Sweet Corn, Proc., Nat. Acad. Sci. 10: 163–166, 1943.
Dexter, S. T. Separation of Living And Dead Corn Kernels Without Germination, Agrun. Jour. 57: 95–96, 1965.
Nelson & Burr, "Growth Correlates etc." Proc. Nat. Acad. Sci. 32: 83–84, 1946.
Holaday, "Electronic Method for Measurement, etc." Cereal Chem. 41: 533–542, 1964.
"Measuring Potentials In Growing Things" Stetson, Electronic Industries, Dec. 1944, pp. 82–85, 180–181.

Primary Examiner—Robert E. Pulfrey
Assistant Examiner—E. H. Eickholt
Attorney, Agent, or Firm—Woodcock, Washburn, Kurtz & Mackiewicz

[57] ABSTRACT

The process of determining the viability of seeds by means of non-destructive testing and prior to germination wherein seeds from the dry storage state are moistened to cause them to pass into at least the first phase of the pre-germination cycle but without initiating the last phase of pre-germination, applying an electrical potential to each of the seeds to cause an electrical current to pass therethrough, measuring the electrical current passing through each of the seeds, and separating the seeds into groups according to their measured values of electrical current as a measure of their viability. After testing, the seeds may be dried and returned to their dry storage state. This process also has the advantage of separating the seeds in terms of levels of plant growth vigor.

10 Claims, 6 Drawing Figures

METHOD FOR DETERMINING THE VIABILITY OF SEEDS PRIOR TO GERMINATION

BACKGROUND OF THE INVENTION

At present the common method of determining seed germination (defined as growth of the embryo) consists of planting a predetermined number of seeds in light soil or wet toweling and determining the percent with radicle emergence after a fixed interval of time. The laboratory germination test is intended to indicate the field planting value of a seed sample (International Rules for Seed Testing, 1966). Some samples of seeds, however, show a marked discrepancy between laboratory germination and field emergence. Several attempts have been made in the past to develop tests (in greenhouse) that would better indicate the field emergence of seed samples such as germination tests in unsterilized soil and in compost. However these tests are difficult to standardize and take several days to complete. See the articles by S. Matthews and W.T. Bradnock, Proc. Int. Seed Test. Ass. Vol. 32 (1967) No. 3, po. 553–563, and Hort. Res., 1968, Vol. 8 pp. 89–93. In search for a better and shorter test, these authors describe a 24 hour exudation test as a basis for predicting field performance. They report the discovery of a significant negative correlation between the field emergence of seed samples of peas and French beans and the readiness with which seeds from the samples yielded electrolytes to seed-steep water. They found that the samples that exuded electrolytes readily, as measured by the electrical conductivity of seed-steep water after 24 hours, gave low emergence counts in the field. They also found that in the case of peas a similar relation existed between emergence and the exudation of soluble carbohydrates. More recent work of this nature is reported by D.A. Perry and J.G. Harrison in Journal of Experimental Botany, Vol. 21, No. 67, pp. 504–12, May, 1970.

Various methods have been proposed heretofore for determining the germinating value of seeds most of which destroy the test seeds. For example in U.S. Pat. No. 1,330,112 - Gallardo there was proposed a method of determining the germinating value of seed by subjecting selected seeds to the action of a reagent which causes a contrasting difference in color between the fit or sound portions and the unfit or unsound portions of the seed. IN U.S. Pat. No. 2,921,598 - Aegidius there is disclosed an apparatus for determining the germination capacity of seed utilizing a reaction vessel in which selected grains after having been split longitudinally through the embryo are exposed to a reaction with an aqueous solution of a compound which causes a dyeing of the embryo if capable of germinating. In U.S. Pat. No. 3,530,372 - Laukien there is disclosed a method for automatically non-destructively testing plant seeds and sorting the seeds on the basis of the content of a specific substance, such as, e.g., water, oil, etc. The weight of a particular seed and the amount of the given substance contained in it are determined automatically, from which the specific content of the substance of the seed is calculated automatically, whereupon suitable seeds are selected using as the criterion whether the specific content is greater than a predescribed desired value.

Another test that has been applied to seeds over the years is the test for moisture content in storage; however, this is not a test for germination or field emergence. Electric moisture meters for indicating moisture in stored grains have been known for a number of years. One of the early electric moisture meters is disclosed in U.S. Pat. No. 1,059,099 - A. Zeleny (1913). Another apparatus of the electrical type for determining moisture in stored seeds and grains is disclosed in U.S. Pat. No. 2,825,870 - Hart. In the Yearbook of Agriculture "Seeds" (1961), Ways to Test Seeds for Moisture, Lawrence Zeleny points out at page 447 that factors other than moisture content affect the electrical properties of seed, and a more thorough understanding of these factors will be required before any appreciable increase in accuracy of electric moisture-testing methods can be expected.

The need for determining the potential viability of seeds is more clearly understood when it is realized that a seed grower may have a stock pile of several tons of seeds to be placed on the commercial market. If he finds, however, that the level of viability in this particular batch of seeds is lower than a prescribed standard germination level, set down by Government spedifications, then the entire batch of seeds has to be discarded. If, however, a method is available for non-destructively separating out the non-viable seeds, then obviously a high percentage of the stock pile of seed could be saved for distribution.

SUMMARY OF THE INVENTION

The present invention is directed to a method of non-destructive testing for determining the viability of individual seeds and also has the advantage of separating seeds in terms of levels of plant growth vigor and field emergence.

The novel method disclosed herein is based on monitoring a bio-electric current which originates in plants under conditions of normal physiological activity. Every living organism contains levels of redox activity, and in plants bio-electric currents established by redox reaction have been shown to be associated with ion mobility, W.C. Levengood, "Redox Currents Associated with Ion Mobility in Stems of Plants," Can. J. Bot., 48, pp. 1099–1108 (1970). These redox currents originate from the large number of oxidation and reduction mechanisms within the plant tissue. The method disclosed herein is concerned primarily with those mechanisms which are present as the seed initially begins its pre-germination stages.

Seeds are stored in a dry, low metabolic state sometimes referred to as a quiescent state. When a dry seed is placed under the proper environmental conditions of germination, that is, a sufficiently high temperature, somewhere around 25° C, and an adequate supply of moisture, the pre-germination processes are initiated. There are essentially three temporally related phases in the pregermination process of any seed, which may be defined as follows:

1. the imbibition phase (water uptake):
2. the hydration phase (Hydrolase enzymes);
3. cell division and cell enlargement phase (ribonuclease synthesis).

Several hours may elapse between the initiation of phase one and phase three. However, by the time phase three is in progress, the seed has reached the stage of irreversibility in its pre-germination cycle. That is, at stage three, the seed can no longer be returned to the dry or dormant state without killing the embryo. In the stage one and two phases, however, even though enzyme activity is in progress, the seed may be dried and returned to the dry, low metabolic state for storage without impairing its viability or vigor. The test method disclosed herein is conducted with seed in phase one of its pre-germination cycle.

When a seed imbibes water, this triggers the release of hormones and enzymes. The release of growth hormones initiates respiratory activity and involves the triggering oxidase and hydrolase enzymes utilized in the conversion of starch in the endosperm to soluble sugars ultimately to be used as a food source for the developing embryo. The presence of this reservoir of oxidases located in the endosperm provides the source for the bio-electric current. The redox activity can be used to monitor the levels of enzymatic activity and consequently the viability of the seed.

In accordance with the present invention there is disclosed a process for determining the viability of seeds prior to germination which comprises moistening seeds from a dry state for a period of time and at a temperature sufficient to cause the seeds to pass from the dry state into at least the first phase of their pre-germination cycle but without initiating the last phase of said cycle, applying an electrical potential to each of said seeds to cause an electrical current to pass therethrough, measuring the electrical current passing through each of said seeds, and separating the seeds into groups according to their measured values of electrical current as a measure of their viability.

There is also disclosed a method for calibrating the viability of seeds by correlating the radicle lengths with the measured values of electrical current for the corresponding seeds. It has also been found that the viability of seeds may be calibrated by correlating the soil emergence levels and plant heights with the measured values of electrical current for the corresponding seeds and by correlating the field growth conditions with the measured values of electrical current for the corresponding seeds.

For further objects and advantages of the invention, reference is to be had to the following drawings taken in conjunction with the accompanying specification.

Figure 1:
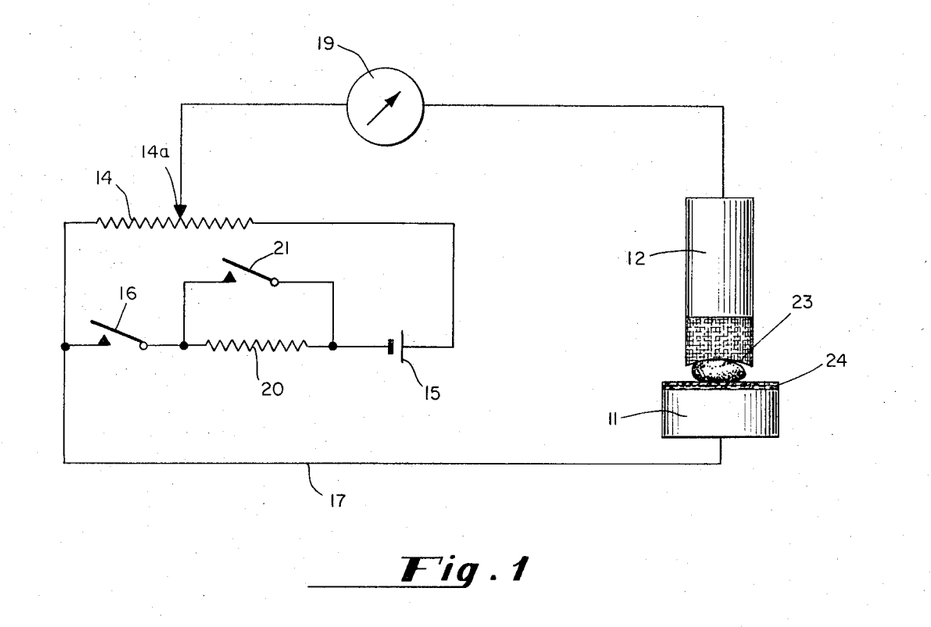
FIG. 1 is a schematic diagram of a system for testing seed in accordance with the method of the present invention.

Referring to FIG. 1, there is shown a schematic diagram of a system for testing seed in accordance with the method of the present invention. The seed is placed between a pair of electrodes 11 and 12 which are connected in electrical circuit with a potentiometer. The potentiometer includes a variable resistance 14 which is connected in a series loop with a battery 15 and a switch 16. The electrode 11 is connected by way of conductor 17 to one end of the variable resistance 14 while the adjustable contact 14a of the variable resistor 14 is connected to electrode 12 by way of an electrical measuring instrument such as a microameter 19. If desired the measuring instrument may include a chart recorder for providing a permanent record of the current output from each seed tested. The potentiometer circuit has also been illustrated as including an optional sensitivity resistor 20 which may be removed from the circuit when not required by closing switch 21.

The seeds to be tested are soaked, sprayed or otherwise placed in water at a temperature sufficiently high to begin the pre-germination process. The soaking period is continued until the seeds are well into the first phase of pre-germination (called imbibition), but not until the seeds begin the third phase of pre-germination. In order to obtain a measurable current output from the seeds, the length of the soaking period will vary depending upon the type of seeds being tested. A pre-soak of the seeds from 1 to 2 hours preceding the test is normally sufficient; however, for some seeds such as peanuts the pre-soak may be as short as 15 minutes.

After the pre-soak and while the seeds are still moist they are placed between the two electrodes 11 and 12 and a low electrical potential, on the order of 1.5 volts, is applied between the two electrodes. The electrical potential may be generated by an external source, such as a battery, as illustrated by the example in FIG. 1 or it may be generated by the electro-chemical reaction of dissimilar electrodes, such as electrodes of iron and copper where the oxidation potential between these two metals is about 0.96 volt. Essentially identical results have been obtained with both types of potential sources. In one embodiment of the arrangement shown in FIG. 1 the electrodes 11 and 12 were made from stainless steel with the electrode 11 having a diameter of about 2 centimeters and electrode 12 having a diameter of about 1.2 centimeters. The system using the stainless steel electrodes has an advantage over the iron-copper system in that it is easier to keep the electrodes clean. To improve the electrical contact to the electrodes 11 and 12, a flexible conductor is placed between each metal electrode and the outer surface of the seed. The flexible conductors 23 and 24 in FIG. 1 may be of any suitable type and absorbant paper wet with tap water has been used successfully.

To compare the bio-electric output of the seeds with their potential viability, the seeds are germinated following the determination of the bio-electric current. The radicle lengths are measured after a period of 72-96 hours germination to quantitatively relate the vigor and viability with the test method.

Figure 2:
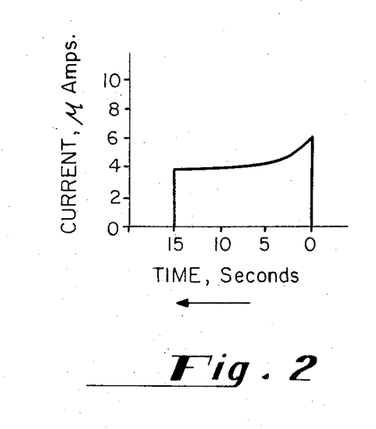
FIGS. 2 and 2a are typical response curves showing the redox current level in microamperes for two different seeds tested in accordance with the present invention.
Figure 2A:
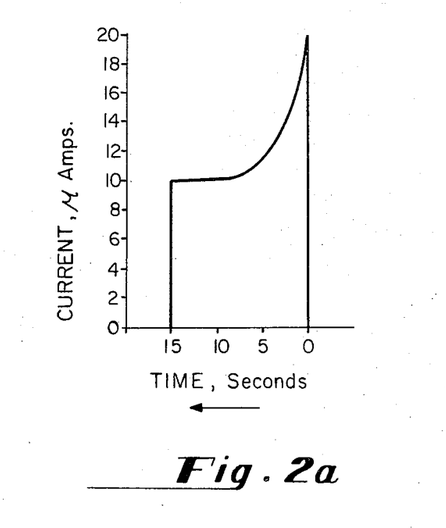

When the electrodes 11 and 12 are placed across a pre-soaked seed, there is a sudden rise in the current, followed by a rapid decline to a steady state value. The nature of these response curves is shown in FIGS. 2 and 2a which are examples of tests made on the seeds of beans of the Tendercrop variety. The following Table I shows the test results on 15 seeds of Tendercrop beans pre-soaked one hour in wet toweling prior to testing. Each seed was placed between stainless steel electrodes in a test circuit of the type illustrated in FIG. 1. The redox current levels in microamps for the peak and steady state values are shown in the tables for each of the seeds and the response curves for seeds 8 and 9 are shown in FIGS. 2 and 2a respectively. When a seed was placed between the electrodes 11 and 12 and the on-off switch 16 was closed to complete the circuit a very sudden current rise occurred and this was followed by a slow decrease, normally about an exponential decay. About a 15 second interval elapsed between the peak value obtained at circuit completion and the subsequent steady state value. The radicle lengths for each of the seeds were taken after 96 hours germination.

Table I

Tendercrop beans pre-soaked one hour in wet toweling stainless steel electrode system

| Seed No. | Redox current level in Microamps Peak | Steady State | Radicle Len. At 96 Hrs. ger |
|---|---|---|---|
| 1 | 15 | 7 | 1.0 cm |
| 2 | 2 | 1.2 | 1.7 cm |
| 3 | 19 | 11 | 0 cm |
| 4 | 6.5 | 3.9 | 2.6 cm |
| 5 | 2 | 1.6 | 4.5 cm |
| 6 | 18 | 7.5 | 0.3 cm |
| 7 | 2.5 | 2.0 | 1.4 cm |
| 8 | 6 | 3.9 | 4.3 cm |
| 9 | 20 | 10 | 0 cm |
| 10 | 19 | 10 | 0 cm |
| 11 | 15 | 7 | 0 cm |
| 12 | 0.5 | 1.0 | 1.8 cm |
| 13 | 9 | 4 | 2.5 cm |
| 14 | 18 | 15 | 0 cm |
| 15 | 21 | 9.5 | 0.2 cm |

It will be seen from Table I that the non-viable seeds occur in those specimens in which the bio-electric output is very large. By eliminating those eight seeds with a steady state current value greater than 5.0 microamperes, i.e., seeds 1, 3, 6, 9–11, 14, 15, the non-viable seeds would be removed from this group shown in Table I. Although three of the eight seeds in the high current group namely seeds 1, 6 and 15 disclosed some radicle growth, it may be seen, by comparing their radicle lengths with other seeds at the lower current levels, that they are much shorter and of a less vigorous nature. By removing seeds having a bio-electric steady state current greater than 5.0 microampers (or an initial peak current greater than 10 microamperes) there is eliminated not only the non-viable seeds but also those of low vigor. While the peak current may be used for rapid automatic sorting, the steady state current value is used under conditions of hand sorting and that is the value referred to in the subsequent test results described herein. The seeds numbered 1, 6 and 15 show the very short under-developed radicles. The seeds with the longer radicles from 1.4 cm to 4.5 cm are those which are grouped in the low current levels with the low bio-electric output. In a routine test method, these seeds would be saved for commercial purposes since this group gave 100 percent germination and excellent vigor in terms of radicle growth. Thus it will be seen that FIG. 2 shows a response curve for seed number 8 which is a viable seed while FIG. 2a shows the response curve for seed number 9 which is a non-viable seed.

In the following examples, the various quantities of seed tested in accordance with the method of the present invention have been broken down into groups as determined by the various ranges of bio-electric current output. In most instances, the percent germination as well as the radicle length is tabulated for each of the different current ranges. It will be apparent from the various examples that the more vigorous seeds, that is, those seeds showing the greater radicle lengths as well as higher germination levels, are present in those groups selected at the lower current levels.

EXAMPLE NO. 1 — PEPPER SEED (C.V. - BELAIRE)

The following Table II shows the test results for pepper seeds of the Belaire variety pre-soaked one hour in water prior to testing. The seeds were tested in a stainless steel electrode system of the type illustrated in FIG. 1 and immediately after testing were placed on wet toweling for germination.

TABLE II

| Group | Current Range Microamps | Germination | Germination time-days | N-seeds |
|---|---|---|---|---|
| A | 0–2 | 94.5% | 5.15 | 36 |
| B | 3–6 | 94.7% | 5.29 | 19 |
| C | 7–15 | 85.7% | 5.34 | 14 |

From the above Table II it will be seen that the seeds were separated into three current ranges identified as groups A, B and C. This is a very high germinating strain with the C group demonstrating a lower germination level than the A and B groups. This is also a very slow germinating plant therefore the lower germination times for the A and B groups is of importance.

EXAMPLE NO. 2 — *BETULA VULGARIS* — SUGAR BEETS

Figure 3:
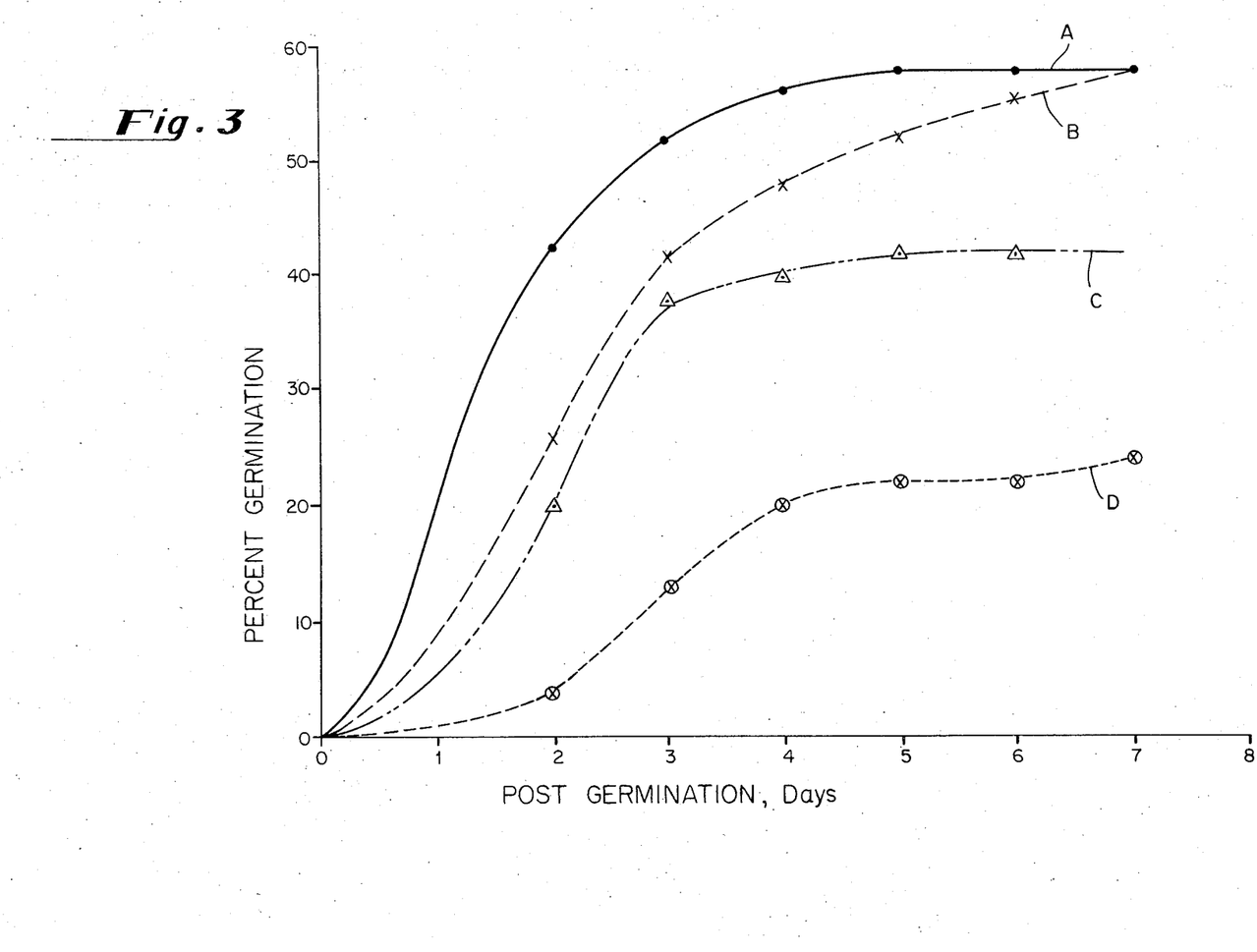
FIG. 3 is a family of germination rate curves in sugar beet seeds.

Referring to FIG. 3 there is illustrated the family of germination rate curves in sugar beet seeds. The percent germination is plotted against post-germination days. The term "post-germination" is used in this application to mean the time subsequent to initial imbibition for the purpose of germination.

The seeds were pre-soaked one hour prior to testing where each seed was placed between stainless steel electrodes and the test circuit of the type illustrated in FIG. 1. There were 50 seeds per group giving a 42 percent overall germination. The curves A, B, C, and D in FIG. 3 are based on the test results derived from the seeds when broken down into the various ranges of bio-electric current output. The seeds in group A had a current range from 0 to 0.1 microampere. The seeds in Group B had a current range from 0.1 to 0.6 microampere. The seeds in Group C had a current range from 0.6 to 1.5 microamperes and the seeds in Group D had a current range from 1.5 to 3.5+ microamperes. From curve A it will be seen that the seeds in Group A have the highest percent germination with the seeds in group D having the lowest percent germination. Here again it will be seen that the more vigorous seeds with higher germination levels are present in those groups selected at the lower current levels.

EXAMPLE NO. 3 — *PHASEOLUS VULGARIS* — (C.V. CASCADE)

The following Table III shows the test results on bush bean seeds of the Cascade variety pre-soaked two hours on wet toweling prior to testing. After the current measurement the seeds were returned to the dry storage conditions held four days then germinated. The seeds were tested in a Fe-Cu electrode system of the type described above and the radicles were measured after 32 hours germination.

Table III

| Group | Current range Microamps | Germination | Ave. radicle length | N-seeds |
|---|---|---|---|---|
| A | 0 – 0.3 | 100% | 2.59 cm | 9 |
| B | 0.3 – 1.0 | 100% | 2.26 cm | 13 |
| C | 1.0 – 3.0 | 92% | 2.40 cm | 26 |
| D | 3.0 – 20.0 | 45% | 1.19 cm | 22 |

It will be seen from Table III that the seeds after testing were divided into four groups A-D with both groups A and B having 100 percent germination. Group C also gave high germination namely, 92 percent with an average radicle length almost as long as the average in Group A. It will also be noted that Group D which had the highest current range had a low germination of 45 percent and a correspondingly short average radicle length. There was no apparent loss in vigor or viability from this initial pre-soak and the bio-electric testing. Also it will be seen that the method of testing described herein is of the nondestructive type.

EXAMPLE NO. 4 — *PHASEOLUS VULGARIUS* — C. V. TENDERCROP BEANS - DARK SEEDED

The following table IV shows the test results on Tendercrop beans (dark seeded) pre-soaked 3 hours in wet toweling prior to testing. After the current measurement the seeds were returned to the dry storage conditions, held there for 4 days, then germinated. The seeds were placed between stainless steel electrodes in a test circuit of the type illustrated in FIG. 1 and the radicles were measured after 98 hours germination.

Table IV

| Group | Current range Microamps | Germination | Ave. radicle length | N-seeds |
|---|---|---|---|---|
| A | 0 – 0.3 | 100% | 1.85 cm | 11 |
| B | 0.3 – 2.0 | 100% | 2.02 cm | 11 |
| C | 2.0 – 3.0 | 50% | 0.94 cm | 18 |
| D | 3.0 – 20.0 | 46% | 0.88 cm | 25 |

It will be seen from Table IV that the seeds in both groups A and B had 100 percent germination and that the average radicle length in these groups was substantially greater than those in groups C and D where the germination rate was 50 percent or less. As in the previous examples, the seeds in groups A and B with the lower current ranges provided the highest germination rates and the longer average radicle lengths.

EXAMPLE NO. 5 — *PHASEOLUS VULGARIS* —(C.V. TENDERCROP BEANS - DARK SEEDED)

The following table V shows the soil emergence test data from low viability seed. Tendercrop - dark seeded beans were soaked 1 hour in water prior to the testing in a stainless steel electrode system of the type illustrated in FIG. 1. The seeds were grouped into four current ranges A-D of 24 seeds per group. After testing the seeds were returned to dry storage conditions 7 days and then uniformly planted in greenhouse flats containing wet sand.

Table V

| Group | Current range microamps | Plant Emergence | Defective Plants* | Time Days |
|---|---|---|---|---|
| A | 0–0.1 | 95.8% | 8.7% | 5.3 |
| B | 0.1–4.0 | 91.7% | 9.1% | 5.0 |
| C | 4.0–10.0 | 83.3% | 10.0% | 5.5 |
| D | 10.0–40.0 | 29.2% | 14.3% | 5.4 |

*Defective plants are those with either or both cotyledons and primary leaves missing.
Overall emergence — 75.0%.

It will be seen that the percentage of defective plants increases as the germination level decreases. This demonstrates that the method selects the defective plants as well as those of low vigor. The soil emergence time is also slightly less in the A and B groups.

EXAMPLE NO. 6 — *PHASEOLUS VULGARIS* —(C.V. NIAGARA -773 BEANS)

The following table VI shows the soil emergence test results for Niagara-773 beans. The seeds were pre-soaked 1 hour in water prior to testing in a stainless steel electrode system of the type illustrated in FIG. 1. The seeds were taken from a normal viable stock supply. After testing the seeds were pre-selected into the four groups A-D, dried then planted in moist sand. There were 16 seeds per test group.

Table VI

| Group | Current range microamps | Emergence Through soil | Time days | Defective plants* | 12 day plant ht. |
|---|---|---|---|---|---|
| A | 0.1–1.0 | 93.8% | 6.1 | 6.7% | 7.4±0.8 cm |
| B | 1.0–5.0 | 87.5% | 5.8 | 7.1 | 7.2±0.9 cm |
| C | 5.0–10.0 | 81.3% | 5.5 | 23.0 | 6.7±1.3 cm |
| D | 10.0–20.0 | 50.0% | 6.1 | 75.0% | 5.1±2.1 cm |

*Defective plants are those with either or both cotyledons and primary leaves missing.

The designated germination on the label of the supply of seeds from which those tested in Table VI were taken was 80.0 percent. The overall emergence determined in the test was 81.3 percent. It will be noted that the seeds in Group A having the lowest current range also had the highest percent emergence through the soil. Group D had the highest current range and not only was the emergence lower in that group but the number of defective plants was higher (as was the case in Table V), the plant heights less and the standard deviation greater. It is also interesting to note that while the seeds in group A took longer to emerge through the soil, the 12 day plant height was greater than the value for the other groups. Thus it will be seen that the method of testing disclosed herein not only selects for plant emergence and germination but also seed vigor and plant uniformity in terms of growth.

EXAMPLE NO. 7 — *PHASEOLUS VULGARIS* —(C.V. TENDERCROP BEANS-WHITE-SEEDED)

The following Table VII is of particular interest as it compares the laboratory germination tests with the field growth and fruit yield data. Each test is a relative indication of plant vigor. The white seeded Tendercrop beans tested were representative of a lower viability strain. The seeds were pre-soaked 15 minutes in water prior to testing in a stainless steel electrode system of the type illustrated in FIG. 1. After testing the seeds were returned to dry conditions for 10 days before germinating and planting. The germination tests were conducted on wet toweling and the radicles measured after 96 hours. The emergence test was conducted under field conditions with the seeds planted at a 6 inch spacing. In each series of tests a total of 30 seeds were used from the four sort grades A-D.

radicle lengths are significantly longer in the A and B grades. From the various tests which have been conducted it has been found that the radicle lengths value is a relative measure of plant vigor within a particular separation grade.

EXAMPLE No. 9 — *ARACHIS HYPOGAEA* — PEANUT SEEDS (LOW GERMINATION SEEDS)

Figure 4:
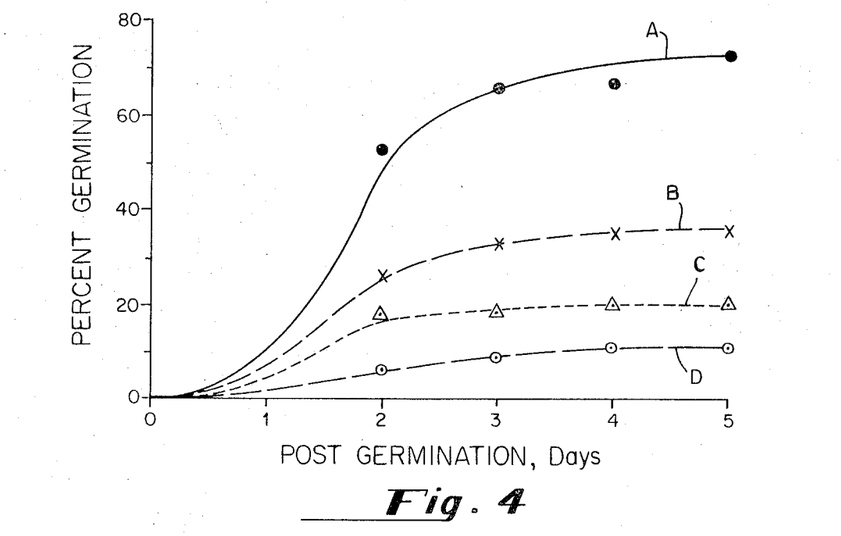
FIG. 4 is a family of germination rate curves in peanuts of very low viability selected by the seed tester illustrated in FIG. 1.

Referring to FIG. 4 there is illustrated a family of germination rate curves in peanuts of very low viability having an overall germination at 27 percent. The seeds were presoaked in water for 15 minutes prior to testing. The seeds were returned to dry storage conditions for 4 days before germinating. Each seed was placed be- Table VII

| Grade | Current range microamp. | Sort Fraction | Level* | Average lgth. of radicle | Emerged | Defective Plants | At Maturity-68 days Plant height | Pods per Plant* |
|---|---|---|---|---|---|---|---|---|
| A | 0–3.0 | 0.25 | 93.4% | 2.51 cm | 73.4% | 9% | 32.6 cm | 11.7 |
| B | 3.0–10.0 | 0.28 | 90.0% | 2.40 cm | 70.0% | 20% | 30.6 cm | 10.5 |
| C | 10.0–18.0 | 0.17 | 80.0% | 2.03 cm | 50.0% | 53% | 25.0 cm | 5.7 |
| D | 18.0–30+ | 0.30 | 40.0% | 1.45 cm | 3.3% | 100% | 24.0 cm | 1.0 |

* Overall germination 76%.
** Field emergence 49%.
*** Podding data based on counts of pods over sieve size No. 2.

It will be seen from Table VII that all of the percentage of emergent normal plants is lower in the field data (as expected). The relative grading levels remain comparable. The plant heights and fruit yield (pods per plant) are also in agreement with the radicle length data. Thus it will be seen that the germination tests can be translated into a field evaluation of field growth and fruit maturity.

EXAMPLE NO. 8 — *ARACHIS HYPOGAEA* — PEANUT SEEDS

The following Table VIII shows the test results on peanut seeds taken from a high germination lot. The seeds were pre-soaked in water 15 minutes prior to testing in a stainless steel electrode system of the type illustrated in FIG. 1. After testing the seeds were germinated on wet toweling and the radicles measured after 72 hours germination. The "sort fraction" represents the fraction of the total lot sorted (618 seeds) in that particular grade. A total of 30 seeds were germinated in each test group.

Table VIII

| Grade | Current range microamps | Sort Fraction | Germination | Average radicle length |
|---|---|---|---|---|
| A | 5–12 | 0.12 | 96.7% | 0.69 cm |
| B | 12–17 | 0.32 | 93.4% | 0.82 cm |
| C | 17–21 | 0.31 | 90.0% | 0.55 cm |
| D | 21–25+ | 0.25 | 60.0% | 0.62 cm |

From the above table it will be seen that although the germination percentages are high in three grades, the tween stainless steel electrodes and the test circuit was of the type illustrated in FIG. 1. As will be seen in FIG. 4 the seeds in group A had the highest germination percent and this group also had the lowest current range during testing. The current ranges for each of groups A-D is shown in the following Table IX.

Table IX

| Group | Current range microamps | Sort Fraction | Germination |
|---|---|---|---|
| A | 10–15 | 0.03 | 73.4% |
| B | 15–20 | 0.16 | 35.5% |
| C | 20–25 | 0.33 | 20.0% |
| D | 25–40+ | 0.48 | 11.1% |

Overall germination 27%

EXAMPLE NO. 10 — *GOSSYPIUM HIRSUTUM* — COTTON SEED

The following Table X shows the test results on cotton seed (c.v. C-310) of very high germination quality. Nevertheless it will be seen that the testing by the present method did separate the groups in terms of viability and defective seeds. These data are summarized in Table X for the four grades with 20 seeds per group. The "sort fraction" represents the fraction of the total seed lot (318 seeds) separated out into that particular grade. The seeds were pre-soaked for 30 minutes in water prior to testing in a test circuit utilizing stainless steel electrodes of the type illustrated in FIG. 1. The seeds were returned to dry storage conditions 10 days before germinating. The radicles were measured after 72 hours germination.

Table X

| Group | Current range microamps | Germination | Sort Fraction | Ave. radicle length | Defective Embryos |
|---|---|---|---|---|---|
| A | 0–0.5 | 95% | 0.52 | 1.00 cm | 0% |
| B | 0.5–1.0 | 100% | 0.16 | 1.10 cm | 0% |
| C | 1.0–1.5 | 90% | 0.18 | 0.90 cm | 22% |
| D | 1.5–2+ | 50% | 0.14 | 0.86 cm | 50% |

As will be seen from Table X the seeds in Group A and B both had high germination and high average radicle lengths with zero defective embryos. Group C had 90 percent germination and relatively long average radicle lengths. It had 22 percent defecJive embryos. Defective embryos are those where the radicle was deformed and had not completely emerged from the seed coat. It is interesting to note that Group D had only 50 percent germination and had 50 percent defective embryos. The fact that the A and B groups did not contain any defective embryos indicates a higher vigor in these grades.

EXAMPLE NO. 11 — *PISUM SATIVUM* — THE GARDEN PEA (C.V. ICER-95)

Figure 5:
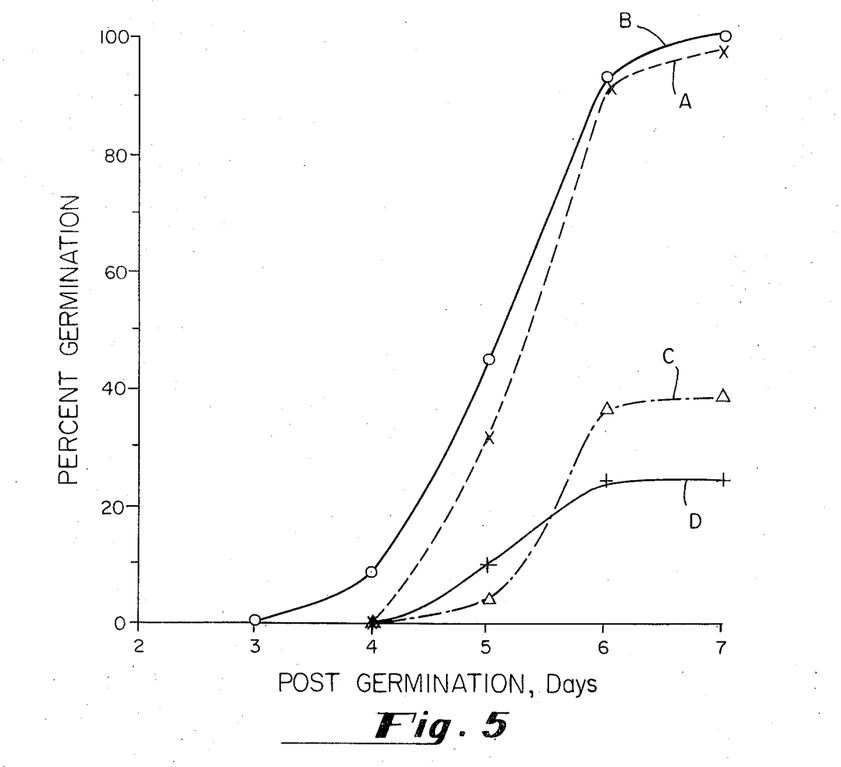
FIG. 5 is a family of germination rate curves in garden peas.

Referring to FIG. 5 there is illustrated a family of germination rate curves in garden pea seeds. The seeds were pre-soaked in water for a period of 15 minutes prior to testing and each seed was then placed between stainless steel electrodes in a test system of the type illustrated in FIG. 1. While the percent germination of group B is slightly higher than that for Group A as shown in FIG. 5, it will be seen from the following Table XI that the seeds germinated from Group A had a slightly longer average radicle length.

Table XI

| Group | Current range microamps | Sort Fraction | Average Radicle Length |
|---|---|---|---|
| A | 0–1 | 0.29 | 1.06 cm |
| B | 1–5 | 0.40 | 1.03 cm |
| C | 5–12 | 0.17 | 0.62 cm |
| D | 12–20+ | 0.14 | 0.49 cm |

EXAMPLE NO. 12 — *GLYCINE MAX* — SOY BEAN (C.V. COKER HAMPTON 266-A)

The following Table XII shows the test results on soy bean seeds pre-soaked 8 minutes in water prior to testing then returned to dry state for 4 days before germinating. The seeds were placed between stainless steel electrodes in a test circuit of the type illustrated in FIG. 1. Thirty seeds were used in the laboratory germination test.

Table XII

| Group | Current range microamps | Sort Fraction | Germination | Ave. radicle length |
|---|---|---|---|---|
| A | 0–3 | 0.27 | 96.6% | 0.92 cm |
| B | 3–6 | 0.24 | 96.6% | 0.55 cm |
| C | 6–12 | 0.14 | 93.6% | 0.67 cm |
| D | 12–20 | 0.35 | 36.3% | 0.59 cm |

It will be noted that while Groups A and B have the same germination value there is a large difference in their radicle lengths.

EXAMPLE NO. 13 — *PHASEOLUS VULGARIS* — NAVY BEAN (C.V. SEA FAIR)

The following table XII is a comparison of laboratory germination and soil emergence in a strain of navy bean (c.v. Sea Fair) with high growth potential. The seeds were soaked 15 minutes in water prior to measuring the current between stainless steel electrodes in a test circuit of the type illustrated in FIG. 1. After testing the seeds were returned to the dry state for a period of 4 days before germinating and planting. There were 30 seeds per grade in the germination test and 24 seeds per grade in the soil test.

Table XIII

| Grade | Current range microamps | Sort Fraction | Lab. Germination Level | Radicle Lgh. | Soil Emergence Level | Defective | Ht. — 9 days |
|---|---|---|---|---|---|---|---|
| A | 0–2.0 | 0.29 | 100% | 0.89 cm | 100% | 8.3% | 7.69±1.18 cm |
| B | 2.0–5.0 | 0.19 | 100% | 0.70 cm | 100% | 16.7% | 7.32±1.14 cm |
| C | 5.0–14.0 | 0.19 | 100% | 0.80 cm | 96% | 47.9% | 5.98±1.72 cm |
| D | 14.0–20+ | 0.33 | 100% | 0.64 cm | 75% | 43.5% | 5.60±1.79 cm |

This is an example of selection for vigor and healthy plants from a seed lot in which the inherent germination potential is at a high level.

EXAMPLE NO. 14 — *PHASEOLUS VULGARIS* — (C.V. NIAGARA 773 beans)

The following Table XIV shows the early flowering test results on Niagara-773 beans. The seeds were pre-soaked one hour in water prior to testing in a stainless steel electrode system of the type illustrated in FIG. 1. After testing the seeds were separated into four groups A-D according to current range. The seeds were stored several weeks in the dry state and then planted under field conditions with 6 inch spacing between plants. There were 30 seeds per test group.

Table XIV

| Group | Current range microamps | Field Emergence | Ave. Plant Height | Plants flowering at 44 days |
|---|---|---|---|---|
| A | 0–0.5 | 96.6% | 34.4 cm | 31.1% |
| B | 0.5–5.0 | 93.5% | 31.5 cm | 7.2% |
| C | 5.0–10 | 80.0% | 27.8 cm | 0.0% |
| D | 10–40+ | 26.7% | 26.3 cm | 0.0% |

From the Table XIV it will be seen that Group A (lowest test current) gave the highest average plant height and the earliest flowering while Group D (highest test current) gave the lowest results. Thus it will be seen that the method of testing disclosed herein also selects for early flowering and consequently early fruit yields in selected seeds.

From the foregoing it will be seen that the present invention is applicable for determining the viability of a wide variety of seeds and is not limited to the specific varieties disclosed herein. After a particular variety of seeds has been calibrated for viability according to the method disclosed herein, the current values thus predetermined are then used to discriminate between other viable and non-viable seeds of this variety.

While in most of the example disclosed herein the seeds have been divided into four groups (A, B, C and D) as to levels of viability, it is understood that such number is arbitrary and may be larger or smaller depending upon the desired number of grades into which the seeds are to be divided. It is to be noted from the various examples that all of the seeds showing high bio-electric currents did not fail to germinate. However, those seeds with high bio-electric current which did germinate normally produced plants with reduced vigor, as measured by the radicle lengths and growth rates of the plants and the number of defective plants. Therefore, the user of seeds tested by this method cannot only be assured of a high and guaranteed germination rate, but also can be assured of a much smaller percentage than normal of weak, stunted or other low vigor plants. This would provide the user with a higher yield per acre when using tested seed and also enables the seed producer to sell the seeds which pass the viability test as being of premium quality.

What is claimed is:

1. A method for determining the viability of seeds prior to germination comprising:
   a. moistening seeds from a dry state for a period of time and at a temperature sufficient to cause the seeds to pass from the dry state into at least the first phase of their pre-germination cycle but without initiating the last phase of said cycle,
   b. applying an electrical potential to each of said seeds to cause an electrical current to pass therethrough,
   c. measuring the electrical current passing through each of said seeds, and
   d. separating the seeds into groups according to their measured values of electrical current as a measure of their viability wherein the viability decreases with the increase in the measured values of electrical current, and wherein the maximum measured values of electrical current in the steady state do not exceed about 40 microamperes at an applied potential of 1.5 volts.

2. The method according to claim 1 including the step of drying the seeds in at least one of the groups to return them to said dry state.

3. The method according to claim 1 including the step of drying the seeds in all of the groups to return them to their dry state.

4. A method for determining the viability of seeds prior to germination comprising:
   a. moistening the seeds for a period of time at a semperature sufficient to cause the seeds to pass from a dry state into the first phase of their pre-germination cycle,
   b. while the seeds are in the first phase of their pre-germination cycle, applying an electrical potential to each of said seeds to cause an electrical current to pass therethrough and measuring the electrical current passing through each of said seeds, and
   c. separating the seeds into groups according to viability as determined by a predetermined maximum value of measured electrical current wherein the viability decreases with the increase in the measured values of electrical current, and wherein the maximum measured values of electrical current in the steady state do not exceed about 40 microamperes at an applied potential of 1.5 volts.

5. The method according to claim 4 including the step of drying the seeds in the group below the predetermined maximum value to return them to said dry state.

6. A method for determining the viability of seeds prior to germination comprising:
   a. moistening seeds from a dry state for a period of time and at a temperature sufficient to cause the seeds to pass from the dry state into at least the first phase of their pre-germination cycle but without initiating the last phase of said cycle,
   b. placing each of said seeds into an electrical measuring circuit and measuring the electrical current passing through each seed,
   c. separating the seeds into groups according to the measured values of electrical current as a measure of their viability wherein the viability decreases with the increase in the measured values of electrical current, and wherein the maximum measured values of electrical current in the steady state do not exceed about 40 microamperes at an applied potential of 1.5 volts, and
   d. drying the seeds at least in the group below a predetermined maximum value of measured electrical current to return them to dry storage conditions.

7. The method according to claim 1 wherein the measured values of electrical current are the steady state values of current.

8. The method according to claim 1 wherein the measured values of electrical current are the initial peak current values.

9. A method for calibrating the viability of seeds comprising:
   a. moistening a selected group of seeds for a period of time at a temperature sufficient to cause the seeds to pass from the dry state into the first phase of their pre-germination cycle,
   b. while the seeds are in the first phase of their pre-germination cycle, applying electrical potential to each of said seeds to cause an electrical current to pass therethrough and measuring the electrical current passing through each of said seeds, and wherein the maximum measured values of electrical current in the steady state do not exceed about 40 microamperes at an applied potential of 1.5 volts,
   c. completing the germination cycle of each of said seeds for a predetermined period to produce a radicle on said seeds,
   d. measuring the lengths of each of said radicles, and
   e. correlating the radicle lengths with the measured values of electrical current for the corresponding seeds wherein the radicle lengths decrease with the increase in the measured values of electrical current.

10. A method for calibrating the viability of seeds comprising:

a. moistening a selected group of seeds for a period of time at a temperature sufficient to cause the seeds to pass from the dry state into the first phase of their pre-germination cycle,
b. while the seeds are in the first phase of their pre-germination cycle, applying electrical potential to each of said seeds to cause an electrical current to pass therethrough and measuring the electrical current passing through each of said seeds, and wherein the maximum measured values of electrical current in the steady state do not exceed about 40 microamperes at an applied potential of 1.5 volts,
c. planting said seeds in soil for a predetermined period sufficient to permit at least some of the plants to emerge,
d. measuring the plant heights, and
e. correlating the soil emergence levels and plant heights with the measured values of electrical current for the corresponding seeds wherein the soil emergence levels and plant heights decrease with the increase in the measured values of electrical current.

* * * * *